May 6, 1958  J. J. PFARR ET AL  2,833,493
JATO ATTACHMENT AND EJECTING SYSTEM FOR AIRCRAFT
Filed June 15, 1953  2 Sheets-Sheet 1

INVENTORS:
John J. Pfarr
James O. Billups

By Herbert E. Metcalf
Their Patent Attorney

May 6, 1958 J. J. PFARR ET AL 2,833,493
JATO ATTACHMENT AND EJECTING SYSTEM FOR AIRCRAFT
Filed June 15, 1953 2 Sheets-Sheet 2
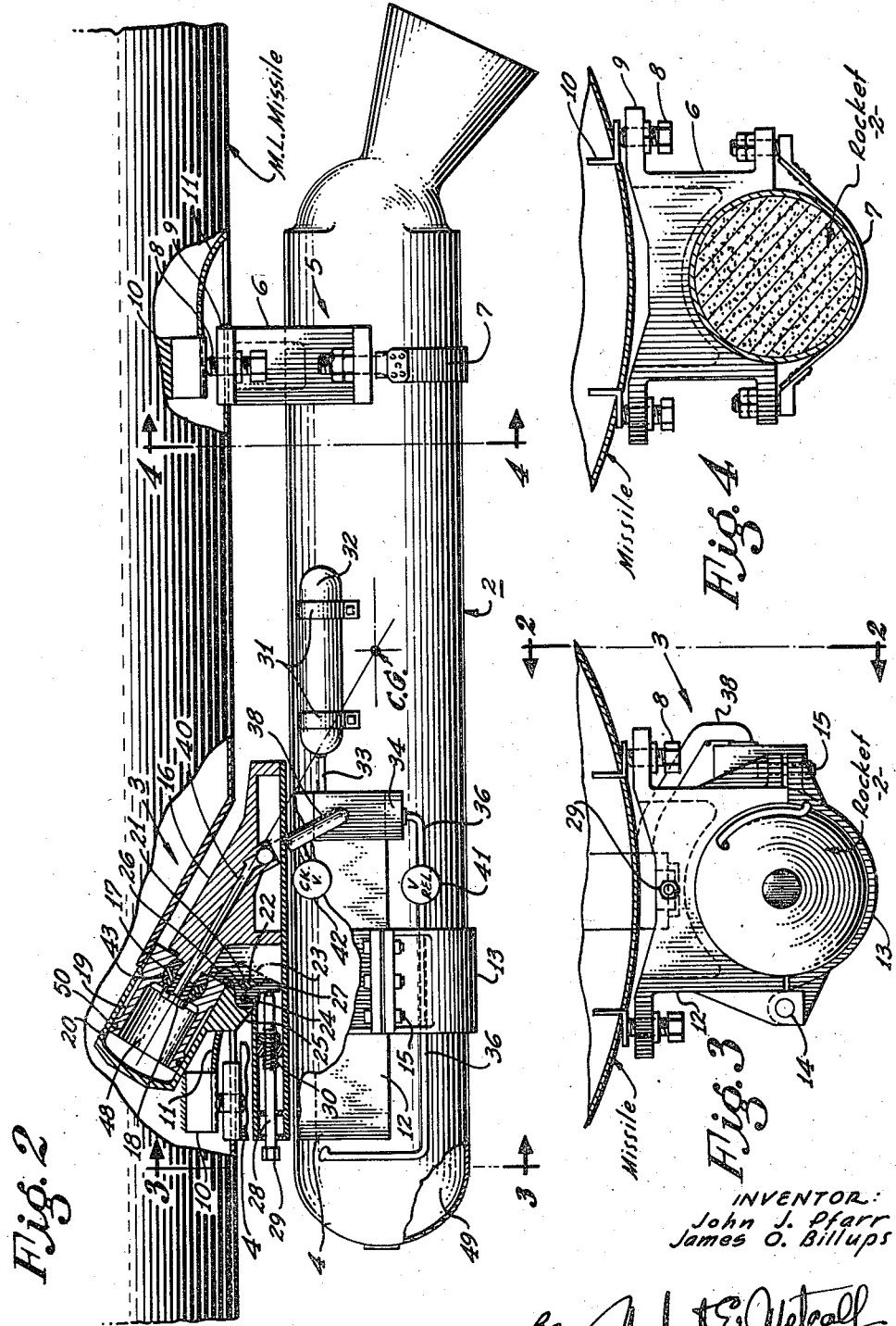
INVENTOR:
John J. Pfarr
James O. Billups United States Patent Office 2,833,493
Patented May 6, 1958

2,833,493

JATO ATTACHMENT AND EJECTING SYSTEM FOR AIRCRAFT

John J. Pfarr, Inglewood, and James O. Billups, Manhattan Beach, Calif., assignors to Northrop Aircraft, Inc., Hawthorne, Calif., a corporation of California Application June 15, 1953, Serial No. 361,542

4 Claims. (Cl. 244—54)

This invention relates to a method and means for ejecting "JATO" type rockets and more particularly to a method and means for automatically ejecting "JATO" type rockets after they have expended their energy to augment the thrust of an aircraft to which they are attached in which the pressure of the rocket's exhaust gases are utilized in the ejection operation in conjunction with another source of pressurized gas.

Wherever a "rocket" is referred to throughout this specification and the appended claims it is to be understood that a rocket of the "JATO" type is referred to unless otherwise indicated.

To increase the operational flexibility of a missile rockets are extensively employed to augment the missile's thrust during its launching period. Previously used launching equipment such as, e. g., track-sled launchers and the like, inherently possessed many disadvantages, they were extremely unwieldy requiring extensive transportation facilities and ideal terrain for their operation. The use of rockets directly attached to a missile eliminates to a great extent the inherent disadvantages characteristic of previously used launching equipment. Utilizing directly attached rockets during the launching of a missile or the like permits the missile to be launched from a cradle or launcher of near zero length, such a launcher is usually extremely mobile and may usually be employed regardless of the terrain.

Rockets employed to provide a missile with additional thrust during the launching period are normally attached exteriorly of the body of the missile with their axes generally parallel with the longitudinal axis of the missile. To circumvent the necessity of a missile carrying a rocket casing after its propellent has expended itself, i. e., after it no longer provides forward thrust, the rocket casing is ejected. Due to configuration of the missile and also the proximity of the rocket in relation to the missile to which it is attached, adequate provision must be made for the rocket's ejection so that it will not damage the missile or interfere with the missile's forward progress in any way. It is also important that the rocket be ejected as quickly as possible after the rocket's propellent has expended itself in order that the missile will not be subject to unnecessary drag. Providing adequate attaching and ejection means for a rocket which ejects it free of the missile at the proper time presents quite a problem. This problem is further complicated by the fact that the ejection mechanism must be fully automatic, no operator being available to actuate the ejection mechanism as would be the case if the rocket was used to augment the thrust of a conventional airplane.

Accordingly it is an object of the present invention to provide a method and means for automatically ejecting an expended rocket which has been utilized to launch a missile or the like.

Another object is to provide a method and means for automatically ejecting an expended rocket which has been utilized to launch a missile or the like in such a manner that its ejection will not damage the missile or in any way effect its forward progress.

Another object is to provide a method and means for automatically ejecting an expended rocket which has been utilized to launch a missile or the like simultaneously as its propellent is expended.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims.

In the drawings:

Figure 2 is a fragmentary side view (partly in section) of the missile shown in Figure 1, viewed from the line 2—2 of Figure 3, this view shows the relationship of contacting parts of the ejection mechanism and missile, also the relationship of component parts of the ejection mechanism.

Figure 3 is a fragmentary sectional view of the missile and rocket shown in Figure 2, taken on the line 3—3 thereof.

Figure 4 is a fragmentary sectional view of the missile and rocket shown in Figure 2, taken on the line 4—4 thereof.

Figure 1:
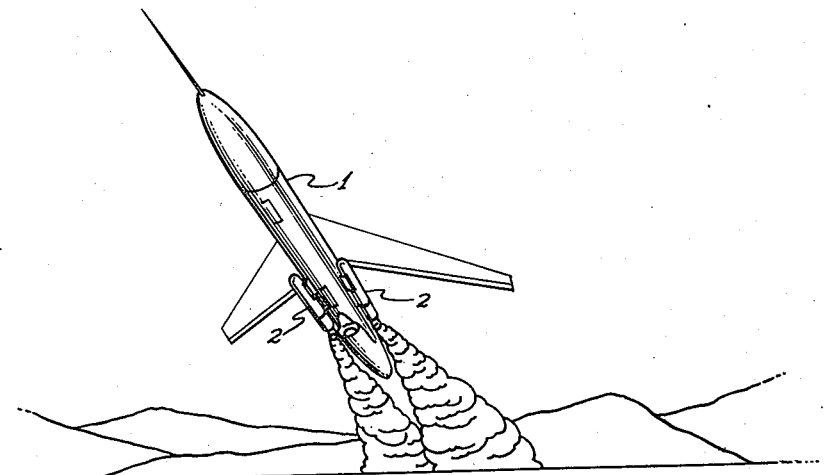
Figure 1 is a perspective view of a missile equipped with two rockets utilizing the attaching and automatic ejection mechanism of the present invention.

Referring to the drawings for a detailed description of a preferred embodiment of the present invention, Figure 1 shows a pilotless missile 1 equipped with two rockets 2 utilizing a solid type of propellant. The rockets 2 are attached on each side of the missile's fuselage near its center of gravity by means of a main fitting 3 and associated parts in a manner presently disclosed. The axes of the rockets are generally parallel with the longitudinal axis of the missile, however, this particular relationship is not imperative. In any event the thrust axes of the rockets and missile power plant are so aligned that their resultant force passes through the center of gravity of the combined mass of the loaded missile and rockets, within certain limits, so that minute pitching moments are present during the launching period. Although the above relationship is extremely important, in fact critical when launching a missile by attaching rockets which provides additional thrust, the means and adjustments that make this relationship possible constitutes no part of the present invention and accordingly are not described herein.

Inboard bearing loads resulting from the thrust created by the rocket's exhaust gases, also pitching components which may be present either under static conditions or during rocket burning, are transmitted to the missile's fuselage by means of the forward portion 4 of the main fitting 3 and an aft fitting 5. The aft fitting 5 is of conventional construction normally used to support an article of cylindrical configuration, it comprises a saddle portion 6 and strap portion 7 which are secured to the rocket in a manner best shown in Figure 4. Adjusting screws 8 pass through threaded apertures in extending portions 9 of the saddle 6, these screws bear against thrust pads 10 in the attached position of the rockets prior to their ejection. Ample clearance adjacent the missile's surface is indicated at 11, this clearance allows screws 8 to clear missile structure as the rocket moves rearwardly during ejection. The forward portion 4 of the main fitting may be constructed similarly as aft fitting 5 if desired or it may be integral with a main fitting 3 as shown in the present embodiment. In either type of construction the saddle portion of the forward fitting is provided with adjusting screws 8 and clearance is also provided for these screws as indicated at 11.

The main rocket fitting 3 comprises an elongated saddle portion 12 and a strap portion 13. The strap portion 13 of the main fitting is preferably of rigid construction and is pivoted to the saddle 12 by means of a hinge pin 14, a plurality of bolts 15 pass through projecting portions of the saddle 12 and strap 13 at a position approximately diametrically opposite hinge pin 14 and provide means for firmly securing the saddle and strap to the outer surface of the rocket and maintain the relative positions of these parts with respect to the rocket 2. By referring to Figure 3 it will be noted the saddle 12 is symmetrically constructed with respect to the longitudinal axis of the rocket 2.

Projecting from the upper portion of saddle 12 is a piston ejection support 16 symmetrically positioned with respect to the saddle. Attached to the forward portion of the support, by means of a bearing 17 and nut 18, is an ejection piston 19. The ejection piston, in the pre-firing position of the rocket as shown in Figure 2, is positioned in an ejection cylinder 20 which is rigidly and fixedly secured to structural members of the missile. The support 16 is positioned and constructed so that the axis of the piston if extended, when in its position within cylinder 20, passes through the center of gravity of the expended rocket 2. The bearing 17 is provided with a spherical surface which mates with a spherical surface of piston 19, these two surfaces allow the piston to align itself within ejection cylinder 20 during the assembling operation. This type of construction also permits relative angular movement of the support 16 and attached parts relative to the piston 19 at such time as the rocket is ejected and begins to fall under the influence of gravity, but while the piston is still partially within cylinder 20.

The normal relative position of the rocket 2 and missile 1 are determined by mating surfaces 21 and 22 of the saddle and missile, respectively, these surfaces are in contacting relationship at the time the rocket is fired, its forward thrust being transmitted to missile surface 22. Prior to the firing of the rocket this relative position is maintained by means of a latch element 23 pivotally mounted on a shear pin 24 which in turn is supported by lug members 25 comprising parts of the missile fuselage. One end portion 26 of the latch bears against an end portion of the piston 19, its other end 27 contacts the end of a rod member 28. The rod 28 is positioned generally parallel with the longitudinal axis of the missile and rocket and extends a suitable distance forward of the main fitting 3. The forward end of rod 28 is provided with a hexagon head 29 whereby the rod may be easily turned for adjustment in a fore and aft direction. Rod 28 is provided with suitable bearing surfaces and a threaded portion 30 which engages similar threads in saddle 12, thus it is seen end portion 26 of the latch will establish firm contact with the end portion of piston 19 upon suitable adjustment of rod 28. Accordingly rocket 2 will be held in the relative position shown in Figure 2 until such time as it is ejected.

Attached to the outer surface of the rocket 2, by means of a pair of straps 31, is a pressure cylinder 32 adapted to contain air at approximately 1800 p. s. i. A conduit 33 provides fluid communication between cylinder 32 and a first compartment 35 of a valve 34 attached to the saddle portion of the main fitting 3. Another conduit 36 provides fluid communication between the interior of the rocket and a second compartment 37 of the valve 34. Still another conduit 38 provides fluid communication with a third compartment 39 of the valve 34 and a bore 40 which is coaxial in part with the axis of piston 19. The bore 40 communicates with the interior of cylinder 20, the nut 18 being of special construction to permit the bore to pass therethrough. The other end of bore 40 extends through a side wall portion of saddle 12 where it connects with conduit 38 in fluid tight relationship. Associated with conduit 36 is a relief check valve 41 and with conduit 38 a vent check valve 42. The various compartments of valve 34, relief valve 41, and vent check valve 42 are shown and presently described in connection with Figure 5. The piston 19 is open at its end most removed from support 16 and is rendered fluid tight at its other end by means of bearing 17, nut 18, and suitably positioned packing rings 43, a packing or piston ring 50 is also utilized to maintain a fluid tight relationship between piston 19 and cylinder 20.

Figure 5:
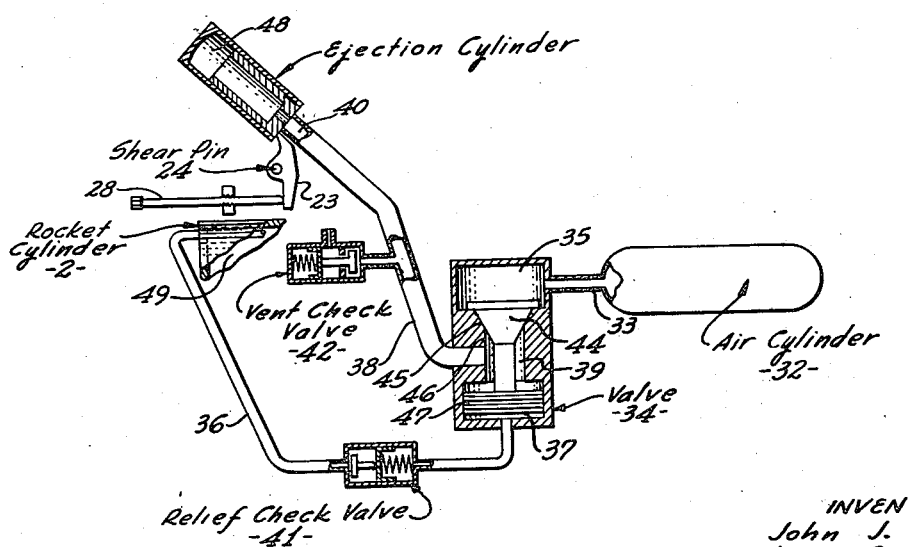
Figure 5 is a schematic view of the rocket's attaching and automatic ejection mechanism as shown in Figure 2.

A more complete understanding of the ejector mechanism and its operation may be had by referring to schematic Figure 5, here a fragmentary portion of rocket 2 and air cylinder 32 are shown. Mounted within the valve 34 is a poppet type valve element 44 seating at 45 on an annular projection 46 extending inwardly from the valve's cylindrical walls. Attached to the stem portion of valve element 44 is a piston 47 rendered fluid tight with the cylindrical walls of valve 34 by means of conventional packing rings. Conduit 36 extends from the forward end of the rocket and communicates with the rocket's combustion chamber 49 and the aforementioned second compartment 37, this compartment comprises the interior portion of valve 34 located below piston 47. Positioned in the conduit 36 is the relief check valve 41 which allows fluid, at a pressure of approximately 1400 p. s. i., to flow from the rocket's chamber to the valve 34 but blocks fluid flow in the opposite direction. Conduit 33 provides a fluid tight passageway between cylinder 32 and the first compartment 35 of the valve, the first compartment comprising the interior of valve 34 above the disk portion of valve element 44 when the latter is in its seated position. The vent check valve 42 associated with conduit 38, allows air from cylinder 32 which may inadvertently escape or flow past valve element 44 to escape to the atmosphere, this vent check valve is calibrated to close at 25–80 p. s. i. Conduit 38 provides a fluid tight passage way for fluid exceeding 25–80 p. s. i., between the cylinder chamber 48, defined by cylinder 20 and piston 19, and the third compartment 39 of the valve located between valve element seat 45 and piston 47. The annular portion 46 of the valve extends downward a suitable distance below the seat of valve element 44 to provide a stop for piston 47, the travel of the piston and valve element 44 is thereby limited. Also shown in this figure is latch element 23, shear pin 24, and rod member 28 in their relative positions in which the latch element retains piston 19 in cylinder 20.

Prior to launching a missile, by means of the rockets 2, the air cylinder 32 is first pressurized with air to a pressure of approximately 1800 p. s. i. Should any air escape past valve element 44 it will not materially effect the pressure in cylinder chamber 48 as such air will escape to the atmosphere through vent check valve 42. Upon the firing of rockets 2 the pressure in the rocket combustion chamber 49 rapidly increases, as this pressure reaches approximately 1400 p. s. i. relief check valve 41 opens subjecting the second compartment of valve 34 to the same pressure as that present in rocket combustion chamber 49. This pressure, acting on the lower surface of piston 47 exerts sufficient force to move the piston and valve element 44 upwardly until the piston contacts annular projection 46. With valve element 44 raised from its seat 45 air from cylinder 32 is free to flow to chamber 48 via conduits 33, 38, and bore 40, at this time the pressure in chamber 48 becomes equal to the pressure in cylinder 32 or approximately 1800 p. s. i. As the pressure in conduit 38 reaches 25–80 p. s. i. vent check valve 42 closes blocking further flow to the atmosphere. As the rockets 2 expend themselves the pressure in the rocket combustion chamber decreases, as this pressure reaches approximately 1400 p. s. i. relief check valve 41 closes arresting further flow from the second compartment 37 of the valve to the rocket combustion chamber. This pressure of 1400 p. s. i. is sufficient to retain valve element 44 in its raised or open position. When sufficient rocket thrust no longer opposes the pressure in chamber 48 the pressure of the air in this chamber acts to move piston 19 rearwardly, pin 24 is sheared due to the pressure exerted on piston 19 acting through latch 23. After pin 24 is sheared the pressure in chamber 48 exerts sufficient force on the piston 19 to eject the expended rocket 2 and component parts of the ejection device. The resultant force exerted by gas confined in chamber 48, acting on piston 19, acts through the center of gravity of the expended rocket, this force moves the rocket rearwardly and away from the missile with the axis of the rocket and missile remaining substantially parallel. Thus it is seen the rocket is ejected in a manner in which it does not contact the missile to damage it or interfere with its forward progress. The missile thus freed of the expended rockets continues in flight propelled by its own thrust.

While in order to comply with the statute, the invention has been described in language more or less specific as to structural features, it is to be understood that the invention is not limited to the specific features shown, but that the means and construction herein disclosed comprises the preferred form of several modes of putting the invention into effect, and the invention is therefore claimed in any of its forms or modifications within the legitimate and valid scope of the appended claims.

What is claimed is:

1. In combination an aircraft; a rocket having a combustion chamber subject to fluid at varying pressures during the burning period thereof; said rocket being releasably attached to said aircraft in a manner to augment the thrust of said aircraft during said burning period; a rocket ejection mechanism including a cylinder attached to said aircraft and a piston attached to said rocket in mating relation with said cylinder to define an expandable chamber; a source of fluid at super-atmospheric pressure; a conduit extending between said fluid source and expandable chamber to provide a fluid path therebetween; control means in said conduit responsive to said fluid at varying pressures whereby fluid flow through said conduit is blocked during the major burning period of said rocket and fluid at said super-atmospheric pressure flows from said source to said expandable chamber during a predetermined interval of the burning period of said rocket; and said cylinder and piston are attached to said aircraft and rocket in such a manner that the force exerted by said fluid at super-atmospheric pressure acting on said piston opposes the thrust of said rocket so that the latter is ejected at such time as the fluid force acting on said piston exceeds the thrust of said rocket.

2. Apparatus as set forth in claim 1: further characterized in that said ejection mechanism includes a latch and a shear pin cooperating with other portions of said ejection mechanism to releasably attach said rocket to said aircraft and in which said pin is sheared at such time as said rocket is ejected from said aircraft.

3. Ejection apparatus adapted to eject a fired rocket from an aircraft or the like and in which the rocket has a combustion chamber subject to fluid at varying pressures during the burning period thereof, the combination comprising: a mechanism, portions of which are adapted to be fixedly secured to a rocket; said mechanism including a piston adapted to mate with the chamber defined by a housing attached to an aircraft to define an expansion chamber; a container in which fluid at super-atmospheric pressure may be stored; valve means attached to said mechanism and including a housing defining a cavity therein a portion of which constitutes a second chamber of cylindrical configuration; a piston operationally mounted in said second chamber to divide the latter into inner and outer compartments; a poppet valve member mounted in said cavity and which is movable in response to movements of said piston between a first position in which said member cooperates with the walls of said housing to divide the remainder of said cavity into a first chamber, spaced from said second chamber, and a third chamber located intermediate said first and second chambers and a second position allowing fluid flow between the latter chambers; a first conduit extending between and adapted to provide fluid communication between said container and said first chamber; a second conduit attached to said housing and communicating with said third chamber and adapted to provide fluid communication between said third chamber and said expansion chamber; a third conduit attached to said housing and communicating with said outer compartment and adapted to provide fluid communication between said outer compartment and said combustion chamber; and a check valve in said third conduit which normally blocks fluid flow through said third conduit to said outer compartment and allows fluid flow from said combustion chamber to said outer compartment at such times as the fluid pressure in said combustion chamber equals a predetermined value.

4. Apparatus as set forth in claim 3: in which said mechanism includes a latch and a shear pin cooperating with other portions of said mechanism to releasably attach a rocket to an aircraft or the like.

References Cited in the file of this patent

UNITED STATES PATENTS

| 2,381,447 | Hedene | Aug. 7, 1945 |

FOREIGN PATENTS

| 238,222 | Germany | Sept. 21, 1911 |
| 585,564 | Great Britain | Feb. 11, 1947 |
| 653,024 | Great Britain | May 9, 1951 |